United States Patent [19]

Brügger

[11] 4,267,218
[45] May 12, 1981

[54] SOLAR COLLECTOR WITH BLACKENED LAYER FACING INSULATION

[75] Inventor: Robert Brügger, Neuss, Fed. Rep. of Germany

[73] Assignee: Langbein-Pfanhauser Werke AG, Neuss, Fed. Rep. of Germany

[21] Appl. No.: 29,075

[22] Filed: Apr. 11, 1979

[30] Foreign Application Priority Data

Apr. 12, 1978 [DE] Fed. Rep. of Germany ....... 2815746

[51] Int. Cl.³ .................................................. F24J 3/02
[52] U.S. Cl. ................................. 428/35; 126/271.1;
126/417; 126/432; 428/469; 428/560; 204/33
[58] Field of Search .................... 428/469, 539, 35;
126/271.1, 417, 432; 204/35 N; 427/115, 126, 435, 436

[56] References Cited

U.S. PATENT DOCUMENTS

| | | | |
|---|---|---|---|
| 4,029,853 | 6/1977 | McMahon | 428/469 |
| 4,061,830 | 12/1977 | Greenberg | 428/469 |
| 4,066,816 | 1/1978 | Sheasby | 428/469 |

FOREIGN PATENT DOCUMENTS 2535838 2/1977 Fed. Rep. of Germany .

OTHER PUBLICATIONS

Glas Solar Collector Development, U.S. Department of Commerce, International Technical Invention Service, PB–253450, p. 54, 1976.

Primary Examiner—Marion McCamish
Attorney, Agent, or Firm—Karl F. Ross

[57] ABSTRACT

A solar collector has a surface turned toward the sun and forms a heat exchange cell which has at least one wall composed of sheet aluminum. A tramsmitting layer of such a wall or the absorption layer thereof is a black layer of aluminum oxide containing Ag or Sn and formed unitarily on the aluminum sheet, e.g. by a chemical or electrochemical process.

4 Claims, 4 Drawing Figures

SOLAR COLLECTOR WITH BLACKENED LAYER FACING INSULATION

FIELD OF THE INVENTION

The present invention relates to a solar collector, the solar collector being of the type which comprises a heat exchange cell, a thermally insulating space ahead of the cell on the energy-input side, an insulating body at the opposite side and, on the side of the heat exchanger cell adjacent the aforementioned space, a wall.

BACKGROUND OF THE INVENTION

Solar collectors of the aforedescribed type are known and, in considering such devices, mention may be made of the advantages of improving the energy absorption efficiency by the solar energy collector, i.e. by blackening an absorber surface.

In a heat exchanger cell of the aforementioned type, a heat carrier, usually water, picks up the solar energy, which has been transformed into sensible heat, to carry this energy to a load or consuming station.

Thus such solar collectors may be used to contribute hot water to the space-heating or water-supply system of a structure or other water heating system thereof or to contribute energy to any industrial, institutional or personal use.

The water generally is passed through respective passages and the thermal-insulating or loss-blocking chamber or space can be composed of a single cell or a multiplicity of cells.

For example, heat exchangers are known (see GLASS SOLAR COLLECTOR DEVELOPMENT, U.S. DEPARTMENT OF COMMERCE, INTERNATIONAL TECHNICAL INVENTION SERVICE PB-253450, PAGE 64) in which the wall of the heat insulating space and thus the wall of the heat exchanger cell turned toward the solar energy input side are composed of glass. In order to improve the heat transmissibility and the solar energy absorption, this wall may be coated by vapor deposition with metals to vary the transmissivity and emission characteristics.

The absorber layer should, in the ideal case, be completely black.

It is also known (see the German Patent Publication-Offenlegungsschrift DE-OS No. 26 11 108) to form the wall of the heat exchanger cell turned toward the insulation side from glass and to coat this wall, on the side thereof at which the insulation is disposed, with absorption-promoting material.

These techniques have proved to be difficult and expensive to carry out and to give rise to solar energy collectors that are fragile, structurally unreliable and prone to failure.

These disadvantages are due only in part to the sensitivity of the glass structure to mechanical stress and the repeated handling to which the solar collector may be subject during transport and mounting. These difficulties can also be attributed in part to the complex manipulations to which the components of the solar collector must be subjected to during manufacture.

Problems are also encountered in the indicated respects when attempts are made to operate the heat exchanger cell under an elevated pressure or to seal the cell against elevated pressure as may be necessary when the solar-energy collector is utilized in a closed system operating under elevated pressure.

OBJECTS OF THE INVENTION

It is the principal object of the present invention to provide an improved solar energy collector whereby the disadvantages of earlier systems are avoided.

Still another object of the invention is to provide a solar energy collector which is less susceptible to damage during transport and use, under most common handling conditions, than earlier collectors having heat exchange cells, heat blocking spaces and insulating bodies of the type described above.

Yet another object of this invention is to provide a highly efficient solar energy collector which can be fabricated at low cost, which can be used conveniently in elevated-pressure and closed-circulation systems and which is reliable and easily mounted.

SUMMARY OF THE INVENTION

These objects are attained, in accordance with the invention, in a solar energy collector which comprises a generally flat heat exchange cell flanked on one side of a thermal-insulation space and, on the opposite side, by a body of thermal insulation, the collector being formed with a first wall disposed on the energy-input side (incident side) of the cell between the latter and the insulating space while a second wall is disposed between the cell and the insulating body.

According to the invention, at least one of these walls (preferably both) is formed of aluminum sheet metal and is provided, on at least one surface, with a black metal-containing aluminum oxide coating.

Advantageously, the first wall is provided on its opposite sides with energy-transmissive coatings in the form of black metal-containing aluminum-oxide layers formed in and upon an aluminum sheet substrate while the second wall is provided only upon its side turned toward and in contact with the body of insulation, with an absorber layer of black metal-containing aluminum-oxide formed in and on a corresponding aluminum sheet substrate. Thus, according to the invention, the walls of the heat exchange cell in contact with the liquid medium are composed of aluminum sheet and the transmitter layer or layers and the absorber layer are each formed of black colored aluminum oxide coatings produced by chemical or electrochemical modification of the aluminum of the respective substrate.

Aluminum sheet, according to the invention, can be any commercially available sheet metal of conventional or commercial aluminum alloys while the black-colored layer can be formed by metal inclusions in the aluminum oxide layer, the inclusions being integrated into the crystalline structure of the aluminum oxide layer.

The invention is based upon by surprising discovery that a sheet aluminum substrate provided with aluminum oxide layers or an aluminum oxide layer which is colored black at least in part by the inclusion of another metal in the crystalline structure or lattice of the aluminum oxide, has excellent transmission and absorption characteristics rendering such aluminum walls as effective as prior glass walls or more effective than glass walls provided with variable depositing or like coatings.

Best results are obtained when both the side of the aluminum wall turned toward and contacting the liquid of the heat exchanger cell are black aluminum oxide layers with metal inclusions of the type required by the invention so that both act as infrared transmitters.

Only the side of the other wall in contact with the liquid of the heat exchanger cell which is turned toward and in contact with the insulating body need be provided with the black metal-including aluminum oxide layer, in which case this layer functions as an absorber for stray infrared energy.

While the layer can be formed in a variety of ways, best results are obtained by the following procedure:

(a) caustic pickling of an aluminum sheet substrate in a sodium hydroxide solution;

(b) acid treatment following step (a) in nitric acid;

(c) anodization following step (b) by direct current in a sulphuric acid solution (d.c./sulphuric acid anodization); and (d) electrolytic coloring following step (c) in the presence of a tin or silver compound.

The metal to be included in step (d) in the aluminum oxide is preferably tin or silver, although both can be incorporated into the aluminum oxide layer, the metal being introduced into the electrolytic coloring solution of step (d) in the form of an appropriate salt, preferably tin sulphate.

The thickness of the aluminum sheet can be selected in accordance with the strength requirements for the pressure to be developed in the heat exchange cell and both the first and second walls can be profiled, e.g., provided with ribs, fins, vanes or corrugations to provide an appropriate flow cross section or residence time of the liquid in the heat exchanger and the desired ratio of heat exchange surface area to flow. Naturally, the profiled portions of the walls will also be provided with such black metal-including aluminum oxide layers.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
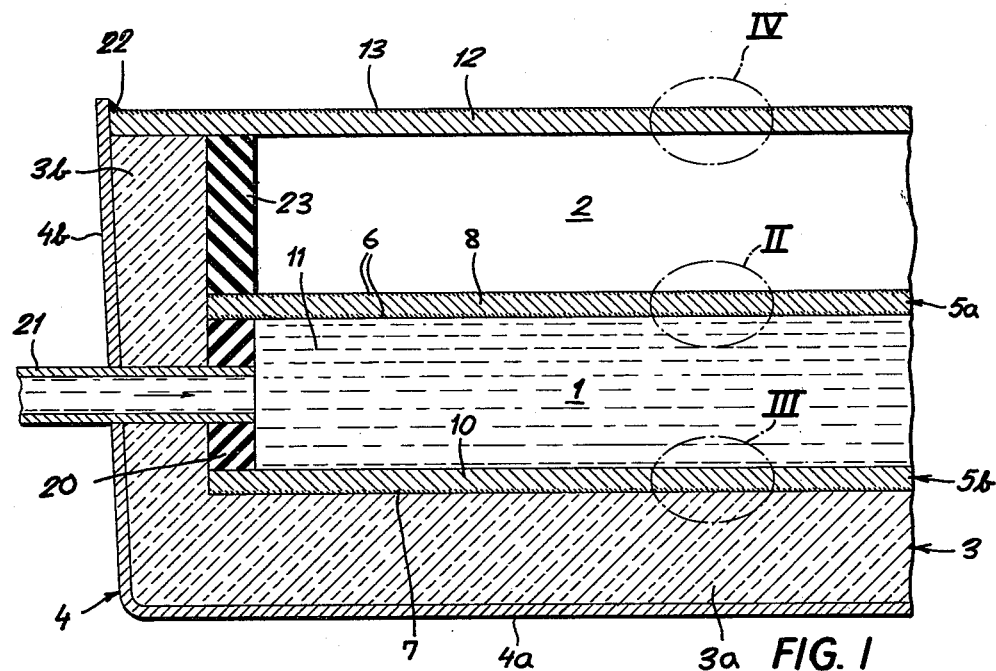
FIG. 1 is a fragmentary cross-sectional view through a solar collector according to the invention shown diagrammatically and illustrating the principles of the present invention.

In the drawing I have shown a solar collector which comprises basically a heat exchange cell 1, a thermal-insulation chamber 2 disposed on the incident-energy side of the solar collector, i.e. the side thereof turned toward the sun, and an insulating body 3 disposed on the side of the heat exchange cell 1 turned away from the incident-energy side.

More particularly, the apparatus comprises a metal housing 4 having a bottom 4a and side walls, one of which has been shown at 4b which may be formed unitarily from deep-drawn sheet metal and which is internally lined by the thermal insulation 3 so that a body 3a of this insulation lies on the underside of the rear wall 5b of the heat exchanger cell while a continuation of this layer 3b extends along the side walls 4b to line the interior thereof.

The heat exchange cell 1 is defined between the rear wall 5b turned away from the open side of the housing facing the energy source, namely the sun, and a wall 5a separating the cell 1 from the insulating chamber 2. A side wall 20 sealingly connects the walls 5a and 5b together all around the cell 1 so that the latter can be constituted as a pressurizable chamber which can be traversed by the liquid heat exchange medium 11, usually water.

This heat exchange medium can be introduced by a pipe 21 at one side of the cell 1 and removed by a pipe communicating through the wall 20 with the interior of cell 1 at the opposite side of the heat exchanger (not shown).

Similarly, the heat insulating space 2, which can be evacuated or simply subdivided into compartments to minimize convective heat loss, is defined between wall 5a and a cover 12 in the form of an aluminum sheet provided with a black layer 13 for maximum absorption of incident solar energy. The plate 12 may be soldered at 22 to the side walls 4b of the housing 4. Naturally, in place of aluminum cover 12, a glass cover can be provided to transmit solar energy by transmission rather than reradiation. Of course, the chamber 2 may be designed to promote convective movement of gas, if it is not evacuated or subdivided, so that a portion of the incident solar energy impinging upon the plate 12 will be transmitted to the plate 5a by reradiation and convective transfer.

The plates 5a and 12 are sealingly interconnected by side walls 23 as described for the side walls 20 previously.

The wall 5a of the heat exchange cell 1 turned toward the insulating chamber 2 is formed with transmitter coatings or layers 6 as will be described in greater detail below while the wall 5b turned toward the insulation 3 and away from the incident side is provided with an absorber coating or layer 7, also described in greater detail below.

According to the principles of the present invention, the walls 5a, 5b of the heat exchange cell are composed of aluminum sheet while the transmitter layers or coatings 6 and the absorber layer or coating 7 are integrally or unitarily formed black metal-including aluminum oxide layers which can be produced as will be described below. For the purposes of the present invention, the term "aluminum sheet" should be understood to refer to any structural aluminum sheet metal alloy in common use capable of the formation of black aluminum oxide coatings in the manner to be described.

I have found that practically all commercial aluminum alloys in sheet form can be provided with black coatings in the manner to be described. Further, the term "black" should be understood to mean as black as possible.

Figure 2:
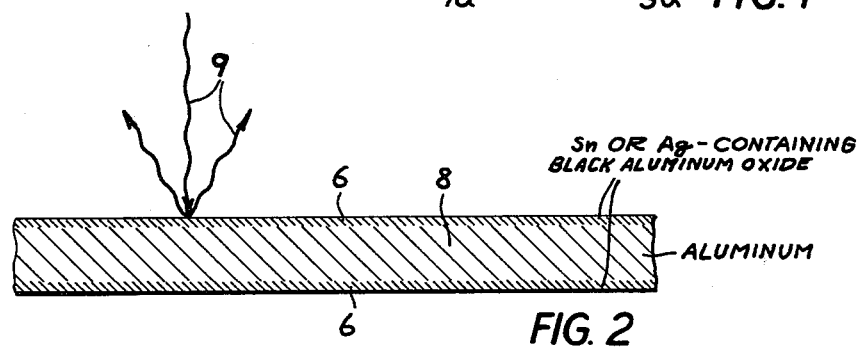
FIG. 2 is an enlarged detailed view of the portion II of FIG. 1.
Figure 3:
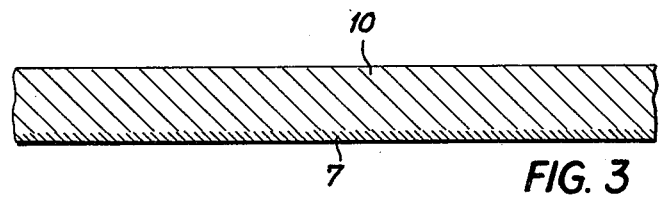
FIG. 3 is an enlarged detail view of the portion III of FIG. 1.
Figure 4:
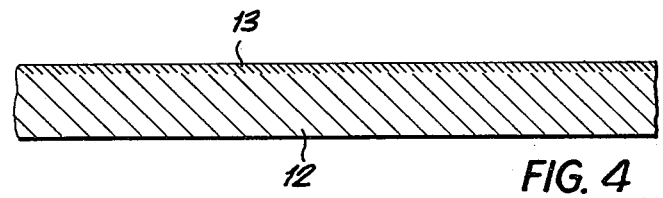
FIG. 4 is an enlarged detail view of the portion IV of FIG. 1.

As has been shown in FIG. 2, in the preferred and best mode embodiment of the invention, the wall 5a is constituted as an aluminum sheet substrate on which the coatings 6 are formed in situ so that they are integral with this substrate and have a crystalline or lattice structure which derives from the lattice structure of the metal of the substrate. The layers 6 both function as infrared transmitters as has been illustrated diagrammatically. The incident energy and reradiated energy in the infrared range have been shown diagrammatically by undulating arrows 9. The energy absorbed by the layer is in part reradiated and in part transmitted to be reradiated by overlying layer 6 into the body of liquid which also picks up thermal energy by conduction at its interface with the lower layer 6 in highly effective manner.

It has been found to be advantageous to provide only the insulation side of the aluminum sheet substrate 10 of wall 5*b* with the black-colored aluminum oxide layer 7. This layer appears to operate by absorbing solar energy which may be transmitted by the heat exchange cell, thereby heating the plate 10 and enabling this energy to be picked up by conduction by the water.

The thermal energy in plate 10 cannot be lost in any other way because this plate is in contact with the insulation body 3*a*.

When the cover 12 is constituted as an aluminum sheet, it can be provided with an absorber layer 13 of black aluminum oxide in the manner described for the aluminum plates 8 and 10.

SPECIFIC EXAMPLE

An aluminum plate for the use in the solar energy collector of FIGS. 1 through 4 is provided with at least one black aluminum oxide layer by the following steps, it being understood that these steps will be carried out along each surface to have such a black layer:

(a) The aluminum sheet is subjected to caustic pickling for a period of one minute in 9% aqueous sodium hydroxide solution at 65° C., whereupon it may be rinsed with water.

(b) The sheet is then subjected to acid pickling for 10 seconds in 50% aqueous (semiconcentrated) nitric acid solution at 20° C., followed by water washing if desired.

(c) The plate is then anodized along at least one surface by a direct current anodization process using a sulphuric acid anodization bath with a current density of 1.5 amperes per square decimeter at a temperature of 20° C.

(d) Thereafter, the plate is subjected to electrolytic coloring using 15 to 20 volts alternating current from a transformer at 22° C. in a bath of the composition given below. Best results were obtained when the voltage during this step was 13 to 20 volts.

Bath composition for step (d) to make 100 liters:
  6.5 kg tin sulphate
  6.0 kg polyglycol (polyethylene glycol)
  10.0 kg phenolsulphonic acid (65% aqueous solution)
  10.0 kg concentrated sulphuric acid
  2.0 kg tartaric acid
  0.5 kg aluminum sulphate
  Balance—water.

Thereafter, the coating (after washing) is stabilized by treating it with superheated steam.

The same results can be obtained by varying the parameters given within readily ascertainable limits since the formation of the black color can be observed without difficulty. For instance, the sodium hydroxide solution used in step (a) can have a concentration between 2 and 37% and the pickling time can range between 10 seconds and 10 minutes at a temperature between room temperature and the boiling point of the solution.

In step (b) the treatment time can range between one second and 5 minutes with a temperature between 5° C. and boiling point of the solution with a nitric acid concentration between 5% and technical grade concentrated nitric acid.

In step (c), the parameters can be varied without difficulty within limits of ±20% in each instance.

The bath composition in step (d) and the temperature and treatment time can all be varied between ±20% of the stated parameters.

Instead of tin sulphate in the composition, a source of silver ions, e.g. silver nitrate can be used, or both tin and silver salts can be employed.

The resulting plate has been found to be especially effective for use in the solar energy collector described above in connection with FIGS. 1 through 4.

I claim:

1. A solar energy collector comprising:
  a housing;
  a heat exchange cell formed in said housing and traversible by a heat exchange medium to carry away collected thermal energy;
  a heat-insulating chamber in said housing adjoining said cell along side thereof turned toward solar energy incident upon the collector; and
  a body of insulating material in said housing along the side of said cell, said cell having a first wall separating it from said chamber and a second wall separating it from said body, each of said walls being constituted of an aluminum sheet, the sheet of said first wall being provided with black metal-containing aluminum oxide layers on both of its sides to form energy transmitter layers and the sheet of said second wall being formed with a black metal-containing aluminum oxide layer on its side turned toward said body of insulation and constituting an energy absorber layer, each of said black aluminum oxide layers containing a metal other than aluminum and selected from the group which consists of tin or silver.

2. The collector defined in claim 1 wherein a black aluminum oxide layer is formed on said second wall only, along the side thereof turned toward and in contact with said body of insulation.

3. The collector defined in claim 2 wherein said chamber is formed along the side thereof turned toward the sun with an aluminum sheet cover having its side face the sun provided with a black aluminum oxide layer.

4. The collector defined in claim 1, claim 2 or claim 3 wherein at least one of said layers is formed by the steps of:
  (a) caustic pickling of an aluminum sheet substrate in a sodium hydroxide solution;
  (b) acid treatment following step (a) in nitric acid;
  (c) anodization following step (b) by direct current in a sulphuric acid solution; and
  (d) electrolytic coloring following step (c) in the presence of a tin or silver compound.

* * * * *